(12) United States Patent
Zhang et al.

(10) Patent No.: US 11,528,690 B2
(45) Date of Patent: Dec. 13, 2022

(54) DATA COMMUNICATION METHOD, APPARATUS, AND SYSTEM

(71) Applicant: HUAWEI TECHNOLOGIES CO., LTD., Guangdong (CN)

(72) Inventors: Yongping Zhang, Beijing (CN); Shulan Feng, Beijing (CN); Jinhuan Xia, Beijing (CN)

(73) Assignee: Huawei Technologies Co., Ltd., Guangdong (CN)

(*) Notice: Subject to any disclaimer, the term of this patent is extended or adjusted under 35 U.S.C. 154(b) by 49 days.

(21) Appl. No.: 16/536,586

(22) Filed: Aug. 9, 2019

(65) Prior Publication Data

US 2019/0364551 A1 Nov. 28, 2019

Related U.S. Application Data

(63) Continuation of application No. PCT/CN2018/075903, filed on Feb. 9, 2018.

(30) Foreign Application Priority Data

Feb. 11, 2017 (CN) .......................... 201710074546.5

(51) Int. Cl.
*H04L 12/28* (2006.01)
*H04W 72/04* (2009.01)
*H04L 5/00* (2006.01)
*H04W 72/12* (2009.01)

(52) U.S. Cl.
CPC ......... *H04W 72/042* (2013.01); *H04L 5/0007* (2013.01); *H04W 72/044* (2013.01); *H04W 72/12* (2013.01)

(58) Field of Classification Search
CPC ...................................................... H04L 12/50
USPC ............................................................ 370/400
See application file for complete search history.

(56) References Cited

U.S. PATENT DOCUMENTS

| 8,489,604 | B1* | 7/2013 | Sadovsky | ............. | G06F 16/951 |
|---|---|---|---|---|---|
| | | | | | 707/737 |
| 8,780,863 | B2 | 7/2014 | Cheng et al. | | |
| 10,187,189 | B2* | 1/2019 | John Wilson | ......... | H04W 48/10 |
| 2013/0107861 | A1 | 5/2013 | Cheng et al. | | |
| 2014/0177564 | A1* | 6/2014 | Ma | .................... | H04W 72/1289 |
| | | | | | 370/329 |
| 2014/0348123 | A1 | 11/2014 | Zhou et al. | | |

(Continued)

FOREIGN PATENT DOCUMENTS

| CN | 101291512 A | 10/2008 |
|---|---|---|
| CN | 103220102 A | 7/2013 |
| CN | 103856922 A | 6/2014 |

OTHER PUBLICATIONS

CN103220102B Translation, Aug. 9, 2019, 12 pages.*

(Continued)

*Primary Examiner* — Dang T Ton
(74) *Attorney, Agent, or Firm* — Fish & Richardson P.C.

(57) ABSTRACT

The present disclosure relates to data communication methods, apparatus, and systems. One example method includes sending, by a sending apparatus, a first group of one or more control resource sets to a receiving apparatus, and sending, by the sending apparatus, first signaling to the receiving apparatus, where the first signaling is used to instruct the receiving apparatus to receive data on a time-frequency resource for data transmission.

8 Claims, 11 Drawing Sheets

(56) References Cited

U.S. PATENT DOCUMENTS

2015/0009952 A1 1/2015 Berggren et al.
2020/0213989 A1* 7/2020 Choi ................. H04W 72/0406

OTHER PUBLICATIONS

PCT International Search Report and Written Opinion issued in International Application No. PCT/CN2018/075903 dated Apr. 20, 2018, 20 pages (with English translation).
Office Action issued in Chinese Application No. 201880010945.8 dated Mar. 16, 2020, 8 pages.
Ericsson, "On Data Transmission on Control Resource Set" 3GPP Draft; R1-1703289, vol. RAN WG1 No. 88, XP05122191, Athens, Greece, Feb. 13-17, 2017, 6 pages.
Huawei, "Resource multiplexing of downlink control and data" 3GPP Draft, R1-1701642, vol. RAN WG1 No. 88, XP05122052, Athens, Greece, Feb. 13-17, 2017, 4 pages.
Huawei et al., "Dynamic resource multiplexing of downlink control and data" 3GPP Draft;R1-1700397, vol. RAN WG1 No. XP051207934, Spokane, USA, Jan. 16-20, 2017, 4 pages.
Extended European Search Report issued in European Application No. dated Jan. 15, 2020, 10 pages.
Office Action issued in Chinese Application No. 201710074546.5 dated Jun. 17, 2021, 16 pages (with English translation).
Sharp, "DL Control Channel and data multiplexing in NR," 3GPP TSG RAN WG1 Meeting #88, R1-1703239, Athens, Greece, Feb. 13-17, 2017, 3 pages.

* cited by examiner

DATA COMMUNICATION METHOD, APPARATUS, AND SYSTEM

CROSS-REFERENCE TO RELATED APPLICATIONS

This application is a continuation of International Application No. PCT/CN2018/075903, filed on Feb. 9, 2018, which claims priority to Chinese Patent Application No. 201710074546.5, filed on Feb. 11, 2017. The disclosures of the aforementioned applications are hereby incorporated by reference in their entireties.

TECHNICAL FIELD

The present invention relates to the field of communications technologies, and in particular, to a data communication method, an apparatus, and a system.

BACKGROUND

In a 4G LTE system, a control channel is transmitted by using a cell-specific resource. For example, in frequency domain, a base station transmits the control channel in an entire bandwidth of the 4G LTE system, and user equipment (UE) performs blind detection on all possible resources within an entire system bandwidth range, and receives control signaling sent by the base station to the user equipment, so as to complete subsequent information reception. A transmitting resource for a control channel in a 5G NR system is still the same as that in the 4G LTE system, and transmission is performed in the entire system bandwidth. As a result, waste of frequency resources is caused because a capacity of the control channel is very small compared with that of data. In addition, costs of the UE increase sharply because a bandwidth of the foregoing defined 5G NR is an operating bandwidth of a base station end. Because the base station serves a plurality of UEs at the same time, an operating bandwidth of each UE is far less than the operating bandwidth of the base station.

In the 4G LTE system in the prior art, each subframe of 4G LTE may be divided into a control area and a data area. The control area is located at the beginning of the subframe, the control area of each subframe occupies an integer quantity of OFDM symbols, and the quantity of OFDM symbols may be dynamically adjusted to meet a requirement of real-time traffic. Before transmitting downlink control signaling, the base station determines, based on a traffic volume, a quantity of OFDM symbols occupied by the control area, and then transmits a physical control format indicator channel (PCFICH) by using a resource at a fixed location. The PCFICH is used to indicate the quantity of OFDM symbols occupied by the control area. Before receiving the downlink control signaling, the UE receives the PCFICH to obtain a control area range.

There are three disadvantages in the foregoing solution. Disadvantage 1: A resource used to transmit the control channel occupies an entire bandwidth in frequency domain. Therefore, reuse is performed only in terms of time. In other words, for the PCFICH, only a control resource in time domain can be reused, and a control resource in frequency domain cannot be used for data transmission. For example, when a few UEs need to be scheduled in a 4G LTE network, only a few resources need to be used for transmitting the downlink control signaling. The base station notifies, through the PCFICH, the UE that current downlink control signaling occupies one OFDM symbol. In the first OFDM symbol of a slot including the downlink control signaling, the control signaling is mapped to a resource element (RE) in a system bandwidth according to a specific rule, and the resource element occupies one subcarrier in frequency domain and occupies one OFDM symbol in time domain. In addition to the RE used to transmit the downlink control signaling in the system bandwidth, another RE within a system bandwidth range in the OFDM symbol can only be idle and cannot be reused for data transmission. Disadvantage 2: The PCFICH is cell-defined information, and UE in a cell needs to correctly receive the PCFICH before receiving the downlink control signaling. Because in the 5G NR system, operating bandwidths of different UEs are different in the entire system bandwidth range of the base station, to ensure that each UE can receive the PCFICH, a fixed resource needs to be predetermined to transmit the PCFICH. However, the operating bandwidth of the UE and the PCFICH may be discontinuous in frequency. This increases implementation complexity of the UE and further increases costs of the UE. Disadvantage 3: An operating frequency band of the 5G NR includes a high-frequency band, and a path loss of a high-frequency signal in a high-frequency band propagation process is very large. To resist the serious propagation path loss, a wireless communications system operating in the high-frequency band usually concentrates energy of a wireless signal into a very small angle range through beamforming, and then an obtained relatively large power gain resists the serious path loss. Beamforming can only cover a very small range. To ensure that all UEs in the cell can receive the PCFICH, PCFICHs carried in beams need to be the same, in other words, the PCFICH is replicated and sent a plurality of times, causing excessively high signaling overheads. Therefore, it is urgent to reduce signaling overheads and dynamically use an idle resource in a control resource set to transmit data.

SUMMARY

Embodiments of the present invention provide a data communication method, an apparatus, and a system, a PCFICH and data are sent in a resource set corresponding to a control area, to dynamically reuse a control channel and data.

To achieve the foregoing objective, according to a first aspect, an embodiment of the present invention provides a data communication method. The method includes: sending a first group of one or more control resource sets to a receiving apparatus; sending a second group of one or more control resource sets to the receiving apparatus; and sending first signaling to the receiving apparatus, where the first signaling is used to instruct the receiving apparatus to receive data on a time-frequency resource for data transmission, the first signaling includes a first instruction and a second instruction, the first instruction is used to indicate the time-frequency resource for data transmission, and the second instruction is used to indicate whether a time-frequency resource corresponding to the second group of control resource sets is reused for data transmission.

In a possible implementation, the first group of resource sets and the second group of resource sets do not overlap each other; or the first group of resource sets and the second group of control resource sets completely overlap; or the first group of resource sets and the second group of control resource sets partially overlap.

In a possible implementation, the sending first signaling to the receiving apparatus includes: determining whether the second group of control resource sets is used for data transmission; and when the second group of control resource sets is not used for data transmission, mapping the first signaling on a time-frequency resource corresponding to the first group of control resource sets, and setting the second instruction as that the time-frequency resource corresponding to the second group of control resource sets is not used for data transmission; or when the second group of control resource sets is used for data transmission, mapping the first signaling on a time-frequency resource corresponding to the first group of control resource sets, setting the second instruction as that the time-frequency resource corresponding to the second group of control resource sets is used for data transmission, and mapping data on the time-frequency resource corresponding to the second group of control resource sets.

In a possible implementation, the sending a first group of one or more control resource sets to a receiving apparatus includes: sending the first group of control resource sets to the receiving apparatus in a semi-static manner; the sending a second group of resource sets to the receiving apparatus includes: sending the second group of resource sets to the receiving apparatus in a semi-static manner; and the sending first signaling to the receiving apparatus includes: sending the first signaling to the receiving apparatus in a dynamic manner.

According to a second aspect, an embodiment of the present invention provides a data communication method, including: receiving a first group of one or more control resource sets sent by a sending apparatus, where the first group of control resource sets indicates a control resource set location; receiving a second group of one or more control resource sets sent by the sending apparatus; and receiving first signaling sent by the sending apparatus, and receiving, based on the first signaling, data on a time-frequency resource for data transmission, where the first signaling includes a first instruction and a second instruction, the first instruction is used to indicate the time-frequency resource for data transmission, and the second instruction is used to indicate whether a time-frequency resource corresponding to the second group of control resource sets is reused for data transmission.

In a possible implementation, the receiving, based on the first signaling, data on a time-frequency resource for data transmission includes: when the second instruction is that the second group of control resource sets is used for data transmission, receiving the data on a time-frequency resource corresponding to a location of the data transmission resource and the time-frequency resource corresponding to the second group of control resource sets; or when the second instruction is that the second group of control resource sets is not used for data transmission, receiving the data on the time-frequency resource for data transmission.

According to a third aspect, an embodiment of the present invention provides a data communication method. The method includes: sending, by a sending apparatus, a first group of one or more control resource sets to a receiving apparatus; sending, by the sending apparatus, first signaling to the receiving apparatus, where the first signaling is used to instruct the receiving apparatus to receive data on a time-frequency resource for data transmission.

In this embodiment of this application, by using the foregoing example, in data communication method provided in this embodiment of the present invention, data is received by using a time-frequency resource corresponding to a data transmission resource frequency location indicated in downlink control signaling and a time-frequency resource corresponding to a second group of one or more control resource sets, so that signaling overheads are reduced, and a control channel and data are dynamically reused in a control resource set.

In a possible implementation, before the step of sending the first signaling to the receiving apparatus by the sending apparatus, the method further includes: sending the second group of control resource sets to the receiving apparatus, where the second group of control resource sets is a subset of the first group of control resource sets, or the second group of control resource sets is a subset of a complementary set of the first group of control resource sets.

In a possible implementation, the data communication method includes: sending second signaling to the receiving apparatus, where the second signaling is used to instruct the receiving apparatus to receive the data on the time-frequency resource for data transmission and the time-frequency resource corresponding to the second group of control resource sets.

In a possible implementation, the second signaling includes a first instruction and a second instruction, the first signaling includes the first instruction, the first instruction is used to indicate the time-frequency resource corresponding to the data transmission resource frequency location, and the second instruction is used to indicate whether the time-frequency resource corresponding to the second group of control resource sets is reused for data transmission.

In a possible implementation, the sending, by the sending apparatus, the second signaling to the receiving apparatus, where the second signaling is used to instruct the receiving apparatus to receive the data on the time-frequency resource corresponding to the data transmission resource frequency location and the time-frequency resource corresponding to the second group of control resource sets includes: determining, based on a control channel capacity or a control channel status, whether the second group of control resource sets is used for data transmission; and when the second group of control resource sets is not used for data transmission, mapping the first signaling on a time-frequency resource corresponding to the first group of control resource sets, and setting the second instruction as that the time-frequency resource corresponding to the second group of control resource sets is not used for data transmission; or when the second group of control resource sets is used for data transmission, mapping the first signaling on a time-frequency resource corresponding to the first group of control resource sets, setting the second instruction as that the time-frequency resource corresponding to the second group of control resource sets is used for data transmission, and mapping data on the time-frequency resource corresponding to the second group of control resource sets. In an embodiment, the first signaling includes a third instruction. When the time-frequency resource corresponding to the second group of control resource sets is used for data transmission, the third instruction is used to indicate a start location of a data area.

In a possible implementation, the sending apparatus may send the first group of control resource sets to the receiving apparatus in a semi-static manner.

According to a fourth aspect, an embodiment of the present invention provides a data communication method. The data communication method includes: receiving, by a receiving apparatus, a first group of one or more control resource sets sent by a sending apparatus, where the first group of control resource sets indicates a control resource set location; and receiving, by the receiving apparatus, first signaling sent by the sending apparatus, and receiving, based on the first signaling, data on a time-frequency resource for data transmission.

In this embodiment of this application, by using the foregoing example, in data communication method provided in this embodiment of the present invention, data is received by using a time-frequency resource corresponding to a data transmission resource frequency location indicated in downlink control signaling and a time-frequency resource corresponding to a second group of one or more control resource sets, so that signaling overheads are reduced, and a control channel and data are dynamically reused in a control resource set.

In a possible implementation, before the step of receiving the first signaling sent by the sending apparatus, the method further includes: receiving the second group of control resource sets sent by the sending apparatus, where the second group of control resource sets indicates whether the sending apparatus sends data on the second group of control resource sets, and the second group of control resource sets is a subset of the first group of control resource sets, or the second group of control resource sets is a subset of a complementary set of the first group of control resource sets.

In a possible implementation, the data communication method further includes: receiving second signaling sent by the sending apparatus, and receiving, based on the second signaling, the data on the time-frequency resource for data transmission and the time-frequency resource corresponding to the second group of control resource sets.

In a possible implementation, the second signaling includes a first instruction and a second instruction, the first instruction indicates the time-frequency resource for data transmission, and the second instruction indicates whether the time-frequency resource corresponding to the second group of control resource sets is reused for data transmission. The receiving, based on the second signaling, the data on the time-frequency resource for data transmission and the time-frequency resource corresponding to the second group of control resource sets includes: when the second instruction is that the second group of control resource sets is used for data transmission, receiving the data on a time-frequency resource corresponding to a data transmission resource location and the time-frequency resource corresponding to the second group of control resource sets; or when the second instruction is that the second group of control resource sets is not used for data transmission, receiving the data on the time-frequency resource for data transmission.

In a possible implementation, the first signaling includes a third instruction, and the third instruction is used to indicate a start location of a data area.

In a possible implementation, the data communication method includes: receiving, based on the start location of the data area, the data on the time-frequency resource corresponding to the first group of control resource sets or the second group of control resource sets.

According to a fifth aspect, an embodiment of the present invention provides a sending apparatus. The apparatus may be configured to perform an operation according to any one of the first aspect or the possible implementations of the first aspect, or the third aspect or the possible implementations of the third aspect. Specifically, the apparatus may include a modular unit configured to perform the operation according to any one of the first aspect or the possible implementations of the first aspect, or the third aspect or the possible implementations of the third aspect. The apparatus may be a device, or may be a chip in a device. When the apparatus is a device, the device includes a processing unit and a transceiver unit. The processing unit may be a processor, the transceiver unit may be a transceiver, and the transceiver includes a radio frequency circuit. Optionally, the device further includes a storage unit, and the storage unit may be a memory. When the apparatus is a chip in a device, the chip includes a processing unit and a transceiver unit. The processing unit may be a processor, and the transceiver unit may be an input/output interface, a pin, a circuit, or the like on the chip. The processing unit may execute a computer-executable instruction stored in the storage unit. Optionally, the storage unit may be a storage unit (for example, a register or a buffer) in the chip, or the storage unit may be a storage unit (for example, a read-only memory (read-only memory, ROM)) that is located outside the chip in the terminal device, another type of static storage device (for example, a random access memory (RAM)) that can store static information and an instruction, or the like. The processor mentioned in the fifth aspect may be a central processing unit (CPU), a microprocessor, or an application-specific integrated circuit (ASIC), or may be one or more integrated circuits configured to control program execution.

According to a sixth aspect, an embodiment of the present invention provides a receiving apparatus. The apparatus may be configured to perform an operation according to any one of the second aspect or the possible implementations of the second aspect, or the fourth aspect or the possible implementations of the fourth aspect. Specifically, the apparatus may include a modular unit configured to perform the operation according to any one of the second aspect or the possible implementations of the second aspect, or the fourth aspect or the possible implementations of the fourth aspect. The apparatus may be a device, or may be a chip in a device. When the apparatus is a device, the device includes a processing unit and a transceiver unit. The processing unit may be a processor, the transceiver unit may be a transceiver, and the transceiver includes a radio frequency circuit. Optionally, the device further includes a storage unit, and the storage unit may be a memory. When the apparatus is a chip in a device, the chip includes a processing unit and a transceiver unit. The processing unit may be a processor, and the transceiver unit may be an input/output interface, a pin, a circuit, or the like on the chip. The processing unit may execute a computer-executable instruction stored in the storage unit. Optionally, the storage unit may be a storage unit (for example, a register or a buffer) in the chip, or the storage unit may be a storage unit (for example, a read-only memory (ROM)) that is located outside the chip in the terminal device, another type of static storage device (for example, a random access memory (RAM)) that can store static information and an instruction, or the like. The processor mentioned in the sixth aspect may be a central processing unit (CPU), a microprocessor, or an application-specific integrated circuit (ASIC), or may be one or more integrated circuits configured to control program execution.

According to a seventh aspect, an embodiment of the present invention provides a communications system, and the communications system includes a sending apparatus and a receiving apparatus.

In the communications system mentioned in this application, the sending apparatus dynamically triggers, based on first signaling, a second group of one or more control resource sets to be reused for data sending, to improve radio resource utilization efficiency without adding excessively high signaling overheads.

According to an eighth aspect, an embodiment of the present invention provides a computer-readable storage medium. The computer-readable storage medium may include a computer-readable instruction, and when a computer reads and executes the computer-readable instruction, the computer is enabled to perform the foregoing data communication method.

According to a ninth aspect, an embodiment of the present invention provides a computer program product. The computer program product may include a computer-readable instruction, and when a computer reads and executes the computer-readable instruction, the computer is enabled to perform the foregoing data communication method.

According to a tenth aspect, an embodiment of the present invention provides a data transmission apparatus. The apparatus includes at least one processor and at least one storage medium, the at least one storage medium stores an instruction, and when the instruction is executed by the processor, the processor is enabled to perform the foregoing data communication method.

Based on the data communication method, the apparatus, and the system provided in the embodiments of the present invention, when receiving the first signaling sent by the sending apparatus, the receiving apparatus receives the data on the time-frequency resource corresponding to the data transmission resource frequency location indicated by the first signaling and the time-frequency resource corresponding to the second group of control resource sets, so that signaling overheads are reduced, and a control channel and data are dynamically reused in a control resource set.

DESCRIPTION OF EMBODIMENTS

The following describes the technical solutions in the embodiments of the present invention with reference to the accompanying drawings in the embodiments of the present invention.

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. It should be further understood that "first" and "second" in this specification are also intended to distinguish between technical terms during description, to facilitate understanding by a user, and should not be construed as a limitation on the technical terms.

Figure 1:
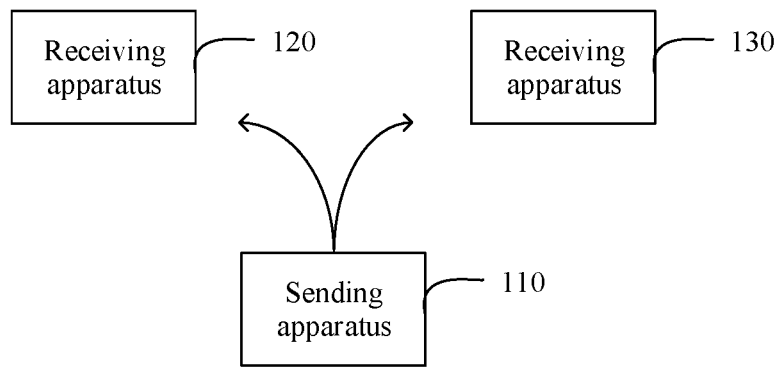
FIG. 1 is a schematic architectural diagram of a communications system according to an embodiment of the present invention.

A network architecture to which the embodiments of the present invention is probably applicable is first described below with reference to FIG. 1. FIG. 1 is a possible schematic diagram of a communications system architecture according to an embodiment of the present invention. As shown in FIG. 1, the communications system architecture includes a sending apparatus 110, a receiving apparatus 120, and a receiving apparatus 130. In an embodiment, there may be more than one sending apparatus or receiving apparatus. FIG. 1 shows only one example for description.

In an embodiment, the sending apparatus 110 sends a first group of one or more control resource sets to the receiving apparatus 120 and the receiving apparatus 130. The sending apparatus 110 sends first signaling to the receiving apparatus 120 and the receiving apparatus 130, and the first signaling is used to instruct the receiving apparatus 120 and the receiving apparatus 130 to receive data on a time-frequency resource for data transmission.

The sending apparatus 110, the receiving apparatus 120, and the receiving apparatus 130 may communicate with each other, for example, through a radio wave, visible light, a laser, red light, or an optical fiber. In this embodiment of the present invention, the sending apparatus may include but is not limited to a base station, a wireless access point, and a user apparatus. The receiving apparatus may include but is not limited to a user apparatus, a terminal, a mobile station (MS), UE, or a base station.

In this application, nouns "network" and "system" are usually interchangeably used, but meanings of the nouns may be understood by a person skilled in the art. The user equipment in this application may include various handheld devices, in-vehicle devices, wearable devices (WD), or computing devices that have a wireless communication function, or another processing device connected to a wireless modem, and a mobile station, a terminal, terminal equipment, and the like that are in various forms.

The base station (BS) in this application is a network device that is configured to provide the terminal with a wireless communication function and that is deployed in a radio access network. The base station may include a macro base station, a micro base station, a relay station, an access point, and the like in various forms. In systems using different radio access technologies, names of devices having a base station function may be different. For example, in an LTE network, the device is referred to as an evolved NodeB (eNB or eNodeB). In a fifth generation 5G or NR network, the device is referred to as a new radio NodeB (NR-NB) and the like. For ease of description, the foregoing user equipment in this application may be collectively referred to as UE, and the foregoing network device that provides a wireless communication function for the UE may be collectively referred to as a base station.

In a communications system mentioned in this application, the sending apparatus dynamically triggers, based on the first signaling, a second group of one or more control resource sets to be reused for data sending, to improve radio resource utilization efficiency without adding excessively high signaling overheads.

Figure 2:
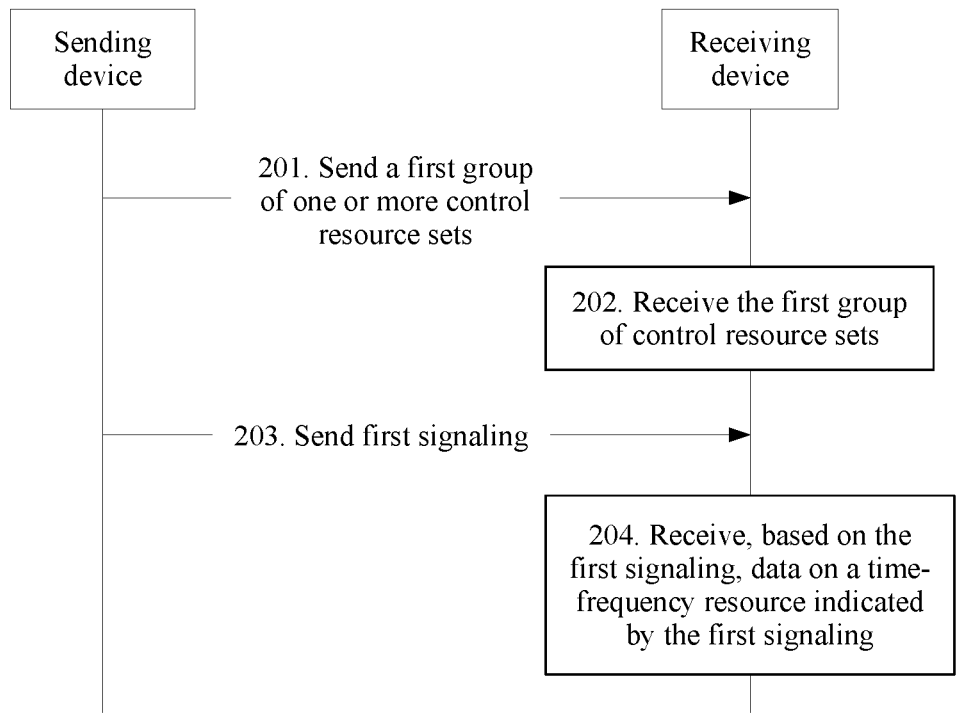
FIG. 2 is a schematic communication diagram of a data communication method according to an embodiment of the present invention.

Correspondingly, FIG. 2 is a schematic communication diagram of a data communication method according to an embodiment of the present invention. As shown in FIG. 2, the embodiment includes step S201 to step S204.

Step 201. A sending apparatus sends a first group of one or more control resource sets to a receiving apparatus.

In an embodiment, the sending apparatus sends the first group of control resource sets and a second group of one or more control resource sets to the receiving apparatus.

In an embodiment, the sending apparatus separately sends the first group of control resource sets and the second group of control resource sets to the receiving apparatus.

Specifically, the sending apparatus notifies the receiving apparatus of the first group of control resource sets and the second group of control resource sets separately by using different downlink signaling.

For example, the sending apparatus pre-configures the first group of control resource sets $\{\mathbb{C}_i, 1 \leq i \leq N\}$ for each receiving apparatus connected to the sending apparatus, and notifies the receiving apparatus through downlink signaling, where a subscript i indicates a number of the receiving apparatus, and N indicates a quantity of receiving apparatuses. The sending apparatus then notifies, through another piece of downlink signaling, the receiving apparatus of the second group of control resource sets $\mathbb{R}_i$ for configuration.

In an embodiment, the sending apparatus sends the first group of control resource sets and the second group of control resource sets together to the receiving apparatus.

Specifically, the sending apparatus notifies the receiving apparatus of the first group of control resource sets and the second group of control resource sets by using the same downlink signaling.

For example, when a period of configuring the first group of control resource sets $\mathbb{C}_i$ is the same as a period of configuring the second group of control resource sets $\mathbb{R}_i$, the first group of control resource sets $\mathbb{C}_i$ and the second group of control resource sets $\mathbb{R}_i$ may be simultaneously configured, in other words, one piece of downlink signaling includes both the first group of control resource sets $\mathbb{C}_i$ and the second group of control resource sets $\mathbb{R}_i$. Alternatively, the receiving apparatus may be notified by using different pieces of downlink signaling.

In an embodiment, the sending apparatus sends the first group of control resource sets to the receiving apparatus in a semi-static manner.

Optionally, the sending apparatus sends the first group of control resource sets $\mathbb{C}_i$ to the receiving apparatus. It is assumed that there are two adjacent control resource sets $\mathbb{C}_i$ and $\mathbb{C}_{i+1}$. A time interval at which the sending apparatus sends $\mathbb{C}_i$ and $\mathbb{C}_{i+1}$ to the receiving apparatus may be determined based on a scheduling status of the sending apparatus. For example, the time interval is dozens of or even hundreds of milliseconds.

In an embodiment, the sending apparatus sends the second group of control resource sets to the receiving apparatus in a semi-static manner.

Optionally, the sending apparatus sends the second group of control resource sets $\mathbb{R}_i$ to the receiving apparatus. It is assumed that there are two adjacent control resource sets $\mathbb{R}_i$ and $\mathbb{R}_{i+1}$. Similarly, a time interval at which the sending apparatus sends $\mathbb{R}_i$ and $\mathbb{R}_{i+1}$ to the receiving apparatus may be determined based on a scheduling status of the sending apparatus. Details are not described herein.

In an embodiment, the sending apparatus sends the first group of control resource sets and the second group of control resource sets to the receiving apparatus in a semi-static manner.

Optionally, the sending apparatus separately sends the first group of control resource sets $\mathbb{C}_i$ and the second group of control resource sets $\mathbb{R}_i$ to the receiving apparatus, in other words, does not send the first group of control resource sets $\mathbb{C}_i$ and the second group of control resource sets $\mathbb{R}_i$ together. It is assumed that there are two adjacent control resource sets $\mathbb{C}_i$ and $\mathbb{C}_{i+1}$ and two adjacent control resource sets $\mathbb{R}_i$ and $\mathbb{R}_{i+1}$. A time interval at which the sending apparatus sends $\mathbb{C}_i$ and $\mathbb{C}_{i+1}$ to the receiving apparatus may be determined based on a scheduling status of the sending apparatus. For example, the time interval is dozens of or even hundreds of milliseconds. Similarly, a time interval at which the sending apparatus sends $\mathbb{R}_i$ and $\mathbb{R}_{i+1}$ to the receiving apparatus may be determined based on a scheduling status of the sending apparatus. Details are not described herein.

It should be noted that compared with dynamically sending the first group of control resource sets and the second group of control resource sets in real time, sending the first group of control resource sets and the second group of control resource sets to the receiving apparatus by the sending apparatus in a semi-static manner reduces signaling overheads.

Optionally, for the semi-static sending manner, a relationship between control resource sets configured by the sending apparatus for all the receiving apparatuses includes the following several types.

Figure 3:
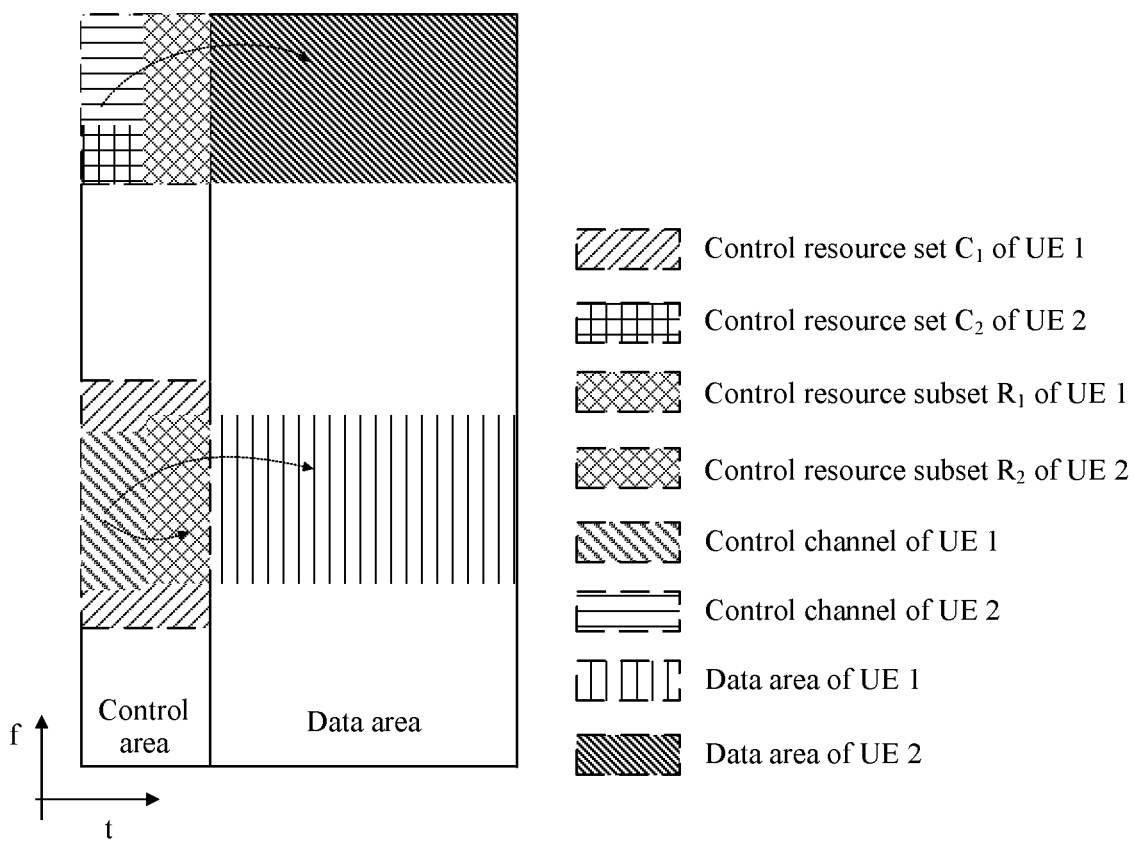
FIG. 3 is a schematic diagram in which control resource sets are partially orthogonal according to an embodiment of the present invention.

Type one: the control resource sets are independent of each other and do not overlap each other (as shown in FIG. 3). For example, the control resource sets $\mathbb{C}_i$ and $\mathbb{C}_j$ are independent of each other and do not overlap each other, and $\mathbb{C}_i \cap \mathbb{C}_j = \emptyset$ (i≠j).

Figure 4:
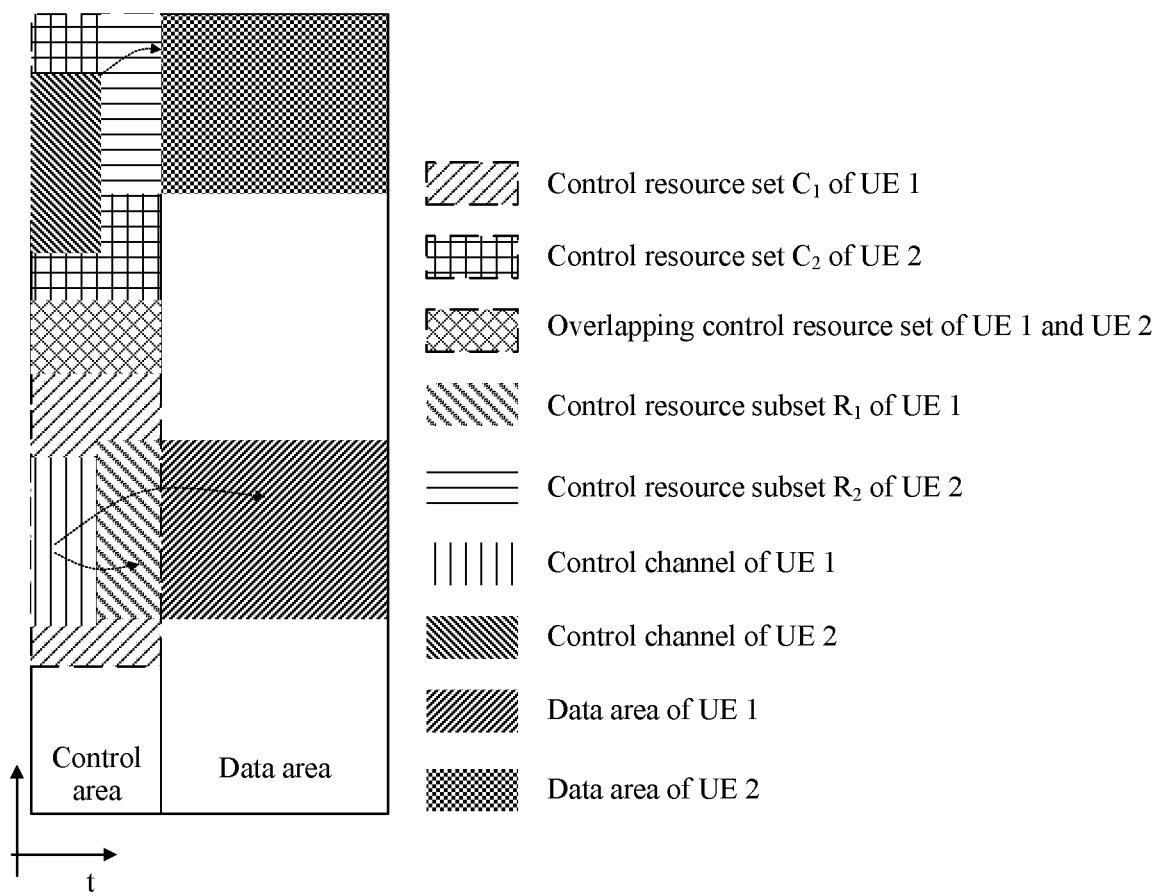
FIG. 4 is a schematic diagram in which control resource sets partially overlap according to an embodiment of the present invention.

Type two: the control resource sets overlap each other, but do not completely overlap (as shown in FIG. 4).

Figure 5:
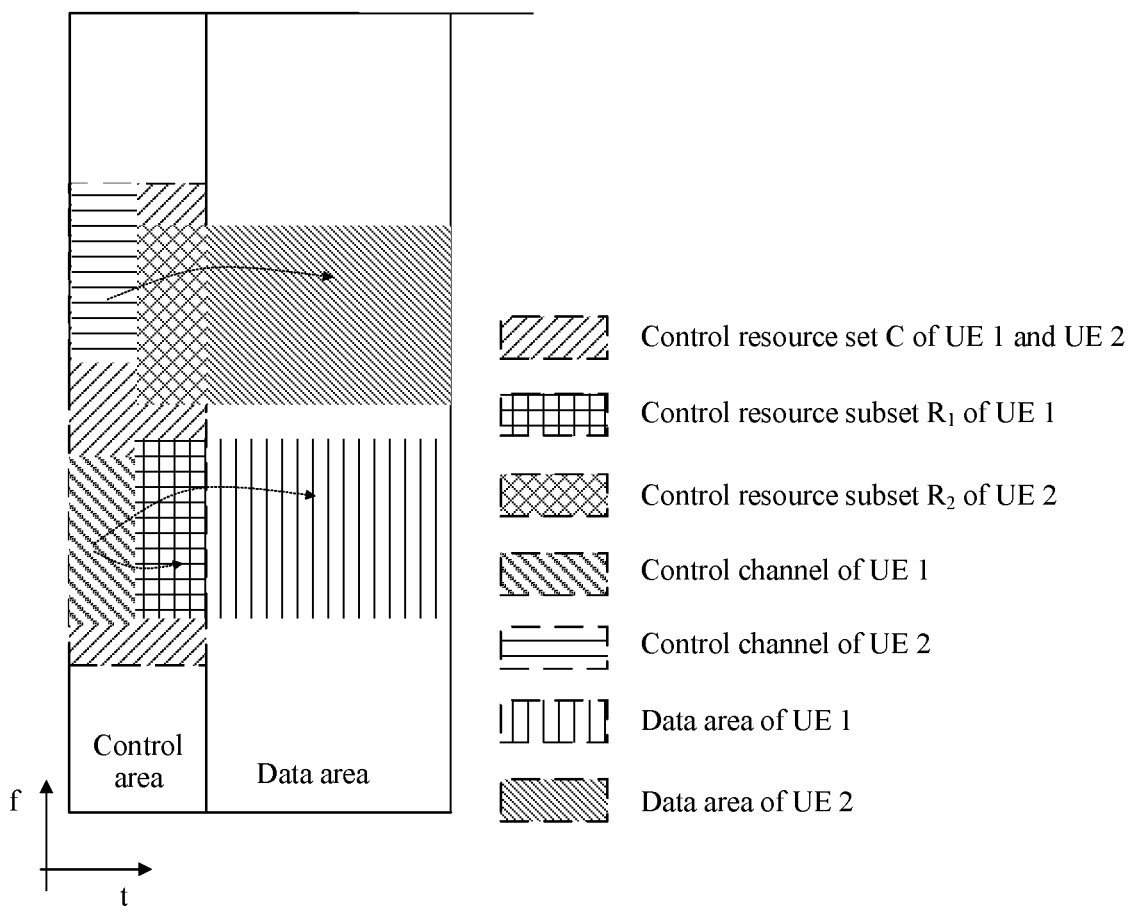
FIG. 5 is a schematic diagram in which control resource sets completely overlap according to an embodiment of the present invention.

Type three: the control resource sets completely overlap each other (as shown in FIG. 5).

In an embodiment, the second group of control resource sets $\mathbb{R}_i$ is a subset of the first group of control resource sets $\mathbb{C}_i$, or the second group of control resource sets $\mathbb{R}_i$ is a subset of a complementary set of the first group of control resource sets $\mathbb{C}_i$, that is, $\mathbb{R}_i \subset \overline{\mathbb{C}}_i$, where $\overline{\mathbb{C}}_i$ indicates the complementary set of $\mathbb{C}_i$.

Specifically, the sending apparatus configures the second group of control resource sets $\mathbb{R}_i$ for the receiving apparatus, and the second group of control resource sets $\mathbb{R}_i$ is a subset of a complementary set of the first group of control resource sets $\mathbb{C}_i$ ($\mathbb{R}_i \subset \overline{\mathbb{C}}_i$), where $\overline{\mathbb{C}}_i$ is the complementary set of $\mathbb{C}_i$, $\overline{\mathbb{C}}_i$ indicates a control resource set other than $\mathbb{C}_i$ in a control area, and a time-frequency resource corresponding to the second group of control resource sets $\mathbb{R}_i$ does not overlap a resource corresponding to the first group of control resource sets $\mathbb{C}_i$.

Optionally, the first group of control resource sets $\{\mathbb{C}_i, 1 \leq i \leq N\}$ is consecutive or inconsecutive resource blocks within a system bandwidth range for operation of the receiving apparatus in frequency domain, and is located in the first one or two OFDM symbols of each subframe in time domain.

It should be noted that the downlink signaling in this embodiment of the present invention is a higher-layer allocation instruction.

Step 202. The receiving apparatus receives the first group of control resource sets sent by the sending apparatus, and the first group of control resource sets indicates a control resource set location.

In an embodiment, the receiving apparatus receives the first group of control resource sets and the second group of control resource sets that are sent by the sending apparatus, the first group of control resource sets indicates a control resource set location, the second group of control resource sets is used to indicate whether the sending apparatus sends data on the second group of control resource sets, and the second group of control resource sets is a subset of the first group of control resource sets, or the second group of control resource sets is a subset of a complementary set of the first group of control resource sets.

In an embodiment, the receiving apparatus separately receives the first group of control resource sets and the second group of control resource sets.

Specifically, the receiving apparatus receives two pieces of downlink signaling to separately obtain the first group of control resource sets and the second group of control resource sets.

In an embodiment, the receiving apparatus receives one piece of signaling to obtain the first group of control resource sets and the second group of control resource sets.

In an embodiment, the receiving apparatus receives, in a semi-static manner, the first group of control resource sets and the second group of control resource sets that are sent by the sending apparatus.

Specifically, because the sending apparatus sends the first group of control resource sets and the second group of control resource sets in a semi-static manner, the receiving apparatus also receives the first group of control resource sets and the second group of control resource sets in a semi-static manner. It is assumed that at a moment t0, the receiving apparatus receives a control resource set $\mathbb{C}_i$, and at a moment t1, the receiving apparatus receives a control resource set $\mathbb{C}_{i+1}$. Then, in a communication process between t0 and t1, because the moment t1 does not arrive, and the receiving apparatus does not receive the control resource set $\mathbb{C}_{i+1}$, the receiving apparatus uses the received control resource set $\mathbb{C}_i$ as a control resource set of the receiving apparatus.

In an embodiment, the second group of control resource sets $\mathbb{R}_i$ is a subset of the first group of control resource sets $\mathbb{C}_i$; or the second group of control resource sets $\mathbb{R}_i$ is a subset of a complementary set of the first group of control resource sets $\mathbb{C}_i$, that is, $\mathbb{R}_i \subset \overline{\mathbb{C}}_i$, where $\overline{\mathbb{C}}_i$ indicates the complementary set of $\mathbb{C}_i$.

Specifically, the sending apparatus configures the second group of control resource sets $\mathbb{R}_i$ for the receiving apparatus, the second group of control resource sets $\mathbb{R}_i$ is a subset of a complementary set of the first group of control resource sets $\mathbb{R}_i$ ($\mathbb{R}_i \subset \overline{\mathbb{C}}_i$), where $\overline{\mathbb{R}}_i$ is the complementary set of $\mathbb{C}_i$, $\overline{\mathbb{C}}_i$ indicates a control resource set other than $\mathbb{C}_i$ in the control area, and the time-frequency resource corresponding to the second group of control resource sets $\mathbb{R}_i$ does not overlap the resource corresponding to the first group of control resource sets $\mathbb{C}_i$.

Optionally, the first group of control resource sets $\{\mathbb{C}_i, 1 \leq i \leq N\}$ is consecutive or inconsecutive resource blocks within a system bandwidth range for operation of the receiving apparatus in frequency domain, and is located in the first one or two OFDM symbols of each subframe in time domain.

It should be noted that compared with dynamically receiving the first group of control resource sets and the second group of control resource sets in real time, receiving the first group of control resource sets and the second group of control resource sets by the receiving apparatus in a semi-static manner reduces signaling overheads.

Step 203. The sending apparatus sends first signaling to the receiving apparatus, and the first signaling is used to instruct the receiving apparatus to receive data on a time-frequency resource for data transmission.

In an embodiment, the sending apparatus sends second signaling to the receiving apparatus, and the second signaling is used to instruct the receiving apparatus to receive the data on the time-frequency resource for data transmission and the time-frequency resource corresponding to the second group of control resource sets.

In an embodiment, the second signaling includes a first instruction and a second instruction, and the first signaling includes the first instruction. The first instruction is used to indicate the time-frequency resource for data transmission, and the second instruction is used to indicate whether the time-frequency resource corresponding to the second group of control resource sets is reused for data transmission.

Specifically, after completing scheduling, the sending apparatus may determine, for example, based on a control channel capacity or a control channel status, whether the second group of control resource sets is used for data transmission. There are several methods for notifying the receiving apparatus whether the second group of control resource sets is used for data transmission.

In a first manner, when the sending apparatus determines that the time-frequency resource corresponding to the second group of control resource sets is not used for data transmission, the sending apparatus maps, on the first group of control resource sets and the second group of control resource sets, the first signaling sent to the receiving apparatus, and sets the second instruction as that the time-frequency resource corresponding to the second group of control resource sets is not used for data transmission.

For example, when none of the time-frequency resource corresponding to the second group of control resource sets $\mathbb{R}_i$ is used for data transmission, the first signaling is directly mapped on the time-frequency resource corresponding to the first group of control resource sets $\mathbb{C}_i$ and the time-frequency resource corresponding to the second group of control resource sets $\mathbb{R}_i$, and the second instruction is set to "no".

In a second manner, when the sending apparatus determines that all the time-frequency resource corresponding to the second group of control resource sets is used for data transmission, the sending apparatus maps, on the first group of control resource sets, the first signaling sent to the receiving apparatus, sets the second instruction as that the time-frequency resource corresponding to the second group of control resource sets is used for data transmission, and maps the data, instead of the first signaling, on the second group of control resource sets.

For example, when all the time-frequency resource corresponding to the second group of control resource sets $\mathbb{R}_i$ is used for data transmission, the first signaling is mapped on the time-frequency resource corresponding to the first group of control resource sets $\mathbb{C}_i$, and the second instruction is set to "yes". In addition, the first signaling is not mapped on the time-frequency resource corresponding to the second group of control resource sets $\mathbb{R}_i$, but the data is mapped on the time-frequency resource corresponding to the second group of control resource sets.

In a third manner, when the sending apparatus determines that one or more segments of the time-frequency resource corresponding to the second group of control resource sets are used for data transmission, the sending apparatus adds, to the first signaling, indication signaling used to indicate a start location of a data area.

Optionally, the first signaling includes a third instruction. The third instruction is used to indicate the start location of the data area.

Specifically, the sending apparatus determines that the time-frequency resource corresponding to the second group of control resource sets $\mathbb{R}_i$ is used for data transmission. The sending apparatus adds, to the first signaling, the third instruction used to indicate the start location of the data area.

Optionally, the first signaling includes a resource indication used to indicate data sending, and a trigger indication used to indicate whether the time-frequency resource of the second group of control resource sets is reused for data transmission.

Optionally, for the trigger indication, only 1-bit or 2-bit physical layer signaling is enough for complete control over the second group of control resource sets to be reused for data transmission. Compared with the prior art in which physical layer signaling is propagated through a PCFICH, the present invention reduces signaling overheads.

It should be noted that the first signaling in this embodiment of the present invention is downlink control signaling, and the "first" is used to distinguish between technical terms during description. In the following description, the first signaling and the second signaling are collectively referred to as the downlink control signaling.

Step 204. The receiving apparatus receives the first signaling sent by the sending apparatus, and receives, based on the first signaling, the data on the time-frequency resource for data transmission.

In an embodiment, the receiving apparatus receives the first signaling sent by the sending apparatus, and receives, based on the first signaling, the data on the time-frequency resource for data transmission and the time-frequency resource corresponding to the second group of control resource sets.

In an embodiment, when the receiving apparatus receives the downlink signaling sent by the sending apparatus, the receiving apparatus performs blind scanning on the time-frequency resource corresponding to the first group of control resource sets.

Specifically, the receiving apparatus decodes information on any one segment of the time-frequency resource corresponding to the first group of control resource sets, for example, decodes the information by using a modulation and coding scheme, and compares decoded information with a verification code. When the decoded information is the same as the verification code, the decoded information is the downlink control signaling sent by the sending apparatus to the receiving apparatus. When the decoded information is different from the verification code, blind detection continues to be performed on a next segment of time-frequency resource in a same manner. The verification code may be generated in the receiving apparatus and the sending apparatus in a preset manner. A generation manner of the verification code is a normal operation, and details are not described herein.

In an embodiment, the first signaling includes a first instruction and a second instruction, the first instruction is used to indicate the time-frequency resource for data transmission, and the second instruction is used to indicate whether the time-frequency resource corresponding to the second group of control resource sets is reused for data transmission.

Specifically, when the second instruction is that the second group of control resource sets is used for data transmission, the data is received on the time-frequency resource for data transmission and the time-frequency resource corresponding to the second group of control resource sets, or when the second instruction is that the second group of control resource sets is not used for data transmission, the data is received on the time-frequency resource for data transmission.

For example, when correctly receiving the first signaling from the sending apparatus, and the second instruction that triggers a second group of resource subsets $\vec{R}$ to be used for data transmission is "yes", the receiving apparatus receives the data on a time-frequency resource corresponding to a data transmission resource frequency location indicated by the first instruction and the time-frequency resource corresponding to the second group of control resource sets $\mathbb{R}_i$. When the second instruction that triggers the second group of control resource sets $\mathbb{R}_i$ to be used for data transmission is "no", the receiving apparatus receives the data only on a time-frequency resource corresponding to a data transmission resource frequency location indicated by the first instruction.

It should be noted that, for the first instruction, only 1-bit or 2-bit physical layer signaling is enough for reuse of the second group of control resource sets $\mathbb{R}_i$ for data transmission.

In an embodiment, the first signaling includes a third instruction, and the third instruction is used to indicate a start location of a data area.

Specifically, the receiving apparatus adaptively determines, based on the first signaling that carries the third instruction and with reference to a resource indicated by resource allocation in the downlink control signaling, a corresponding data transmission resource in each frequency resource.

The receiving apparatus may adaptively determine the data transmission resource in each frequency resource in one of the following manners.

In a first manner, when a data resource overlaps the second group of control resource sets $\mathbb{R}_i$ in frequency domain, the start location of the data area is determined based on the third instruction used to indicate the start location of the data area in the first signaling; and when a data resource does not overlap the second group of control resource sets $\mathbb{R}_i$ in frequency domain, the start location of the data area is a preset location.

Figure 6:
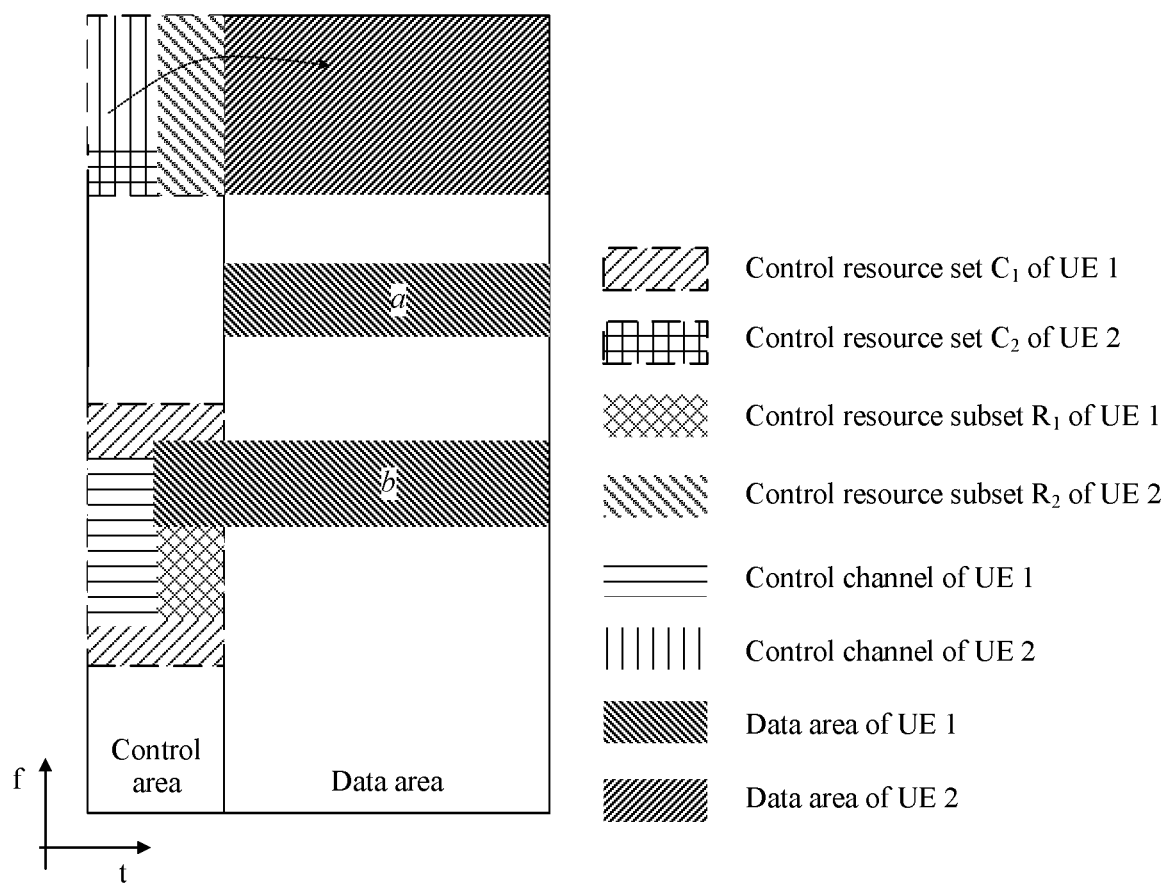
FIG. 6 is a schematic diagram of determining a data resource in FIG. 1.

FIG. 6 is used as an example. It is assumed that a control resource set $\mathbb{C}_1$ occupies the first two OFDM symbols of a slot, and a control resource set $\mathbb{R}_1$ of UE 1 is located in the second OFDM symbol. When a time-frequency resource corresponding to $\mathbb{R}_1$ is reused for data transmission, a base station notifies, through the first signaling, the UE1 that data transmission starts from the second OFDM symbol. Because a frequency resource in an area a does not overlap the time-frequency resource corresponding to $\mathbb{R}_1$, data transmission in this frequency range starts from the third OFDM symbol. For an area b, a frequency resource corresponding to the area b corresponds to the time-frequency resource corresponding to $\mathbb{R}_1$, and data transmission starts from the second OFDM symbol.

For UE 2, because the UE does not receive the third instruction, even if a data resource allocated to the UE 2 overlaps a time-frequency resource corresponding to $\mathbb{R}_2$ in frequency, the time-frequency resource corresponding to $\mathbb{R}_2$ is not reused for data transmission, and a start location of data transmission of the UE 2 still starts from the third OFDM symbol.

In a second manner, when a data resource overlaps the second group of control resource sets $\mathbb{R}_i$ in frequency domain, the start location of the data area is a preset location. When a data resource does not overlap the second group of control resource sets $\mathbb{R}_i$ in frequency domain, the start location of the data area is determined based on the start location of the data area indicated in the first signaling.

Figure 7:
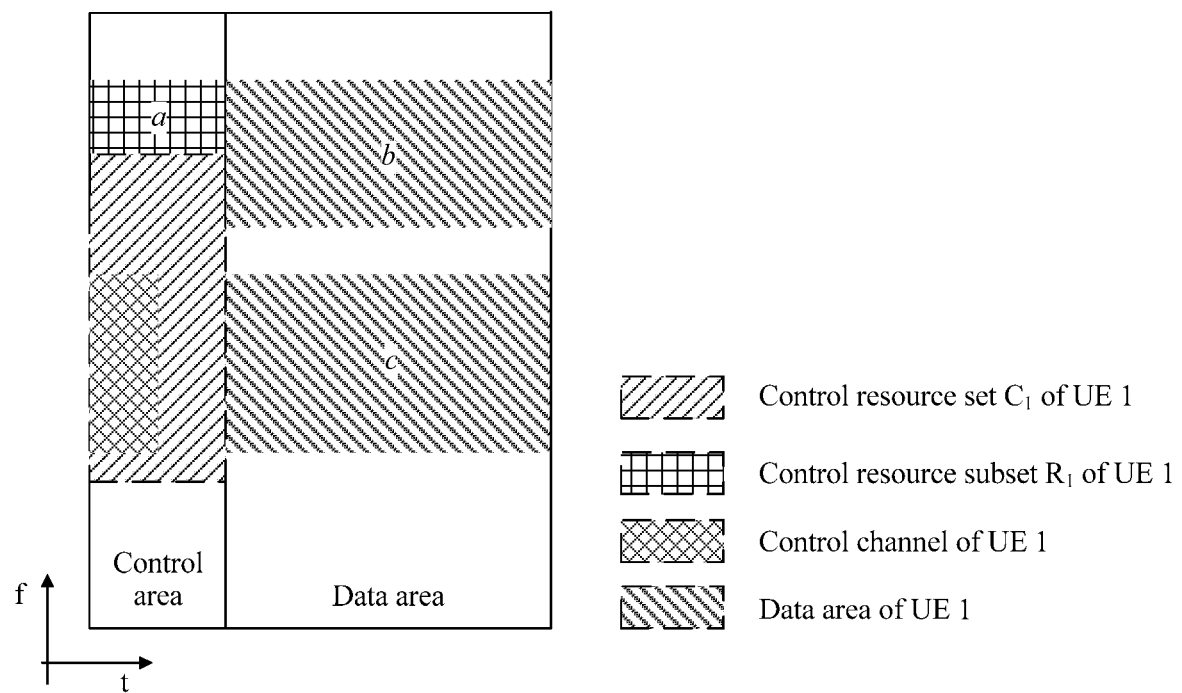
FIG. 7 is a schematic diagram 1 of resource reuse outside a control resource set in a control area according to an embodiment of the present invention.

FIG. 7 is used as an example. It is assumed that only a time-frequency resource corresponding to a control resource that is in a control area and outside a first group of one or more control resource sets $\mathbb{C}_1$ is reused, and the base station notifies, through downlink control signaling, the UE 1 that the start location of data transmission is the first OFDM symbol. After the UE 1 receives the downlink control signaling, the UE 1 receives data on resources in areas a, b, and c.

Figure 8:
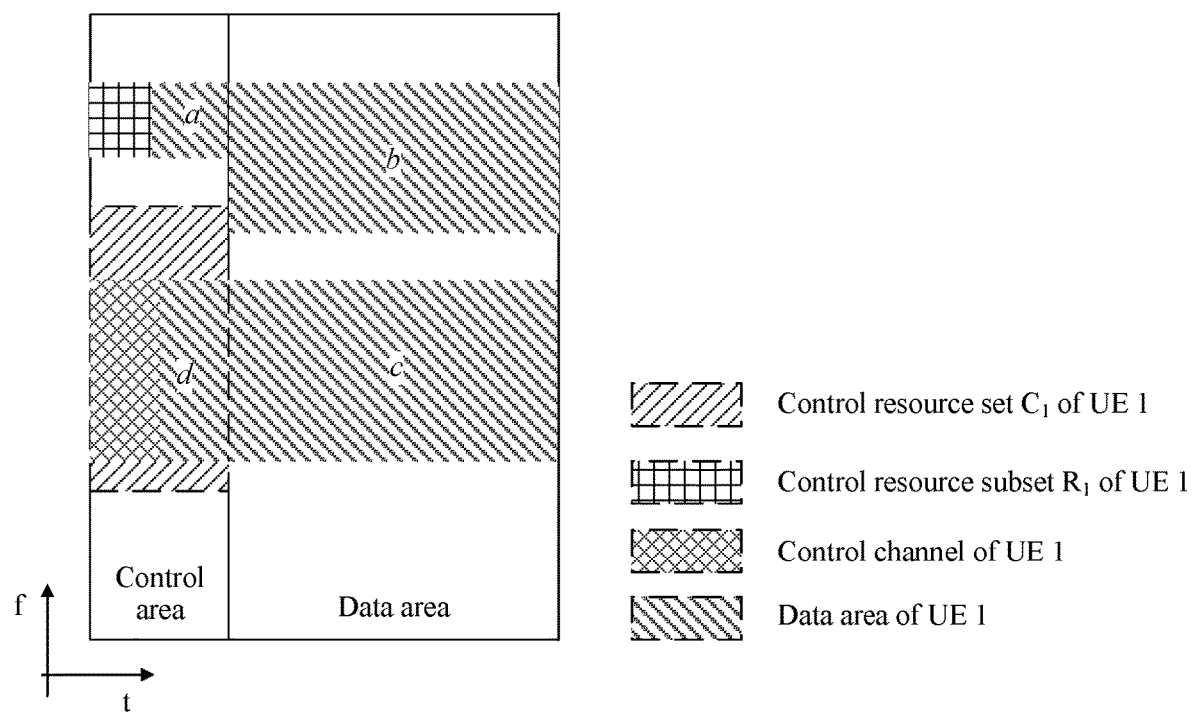
FIG. 8 is a schematic diagram 1 of resource reuse inside and outside a control resource set in a control area according to an embodiment of the present invention.

FIG. 8 is used as an example. It is assumed that the base station simultaneously reuses a time-frequency resource corresponding to control resources that are in a control area and inside and outside a first group of one or more control resource sets $\mathbb{C}_1$, and the base station notifies, through downlink control signaling, the UE 1 that data transmission starts from the second OFDM symbol. It is assumed that the base station configures two segments of time-frequency resources for the UE 1 for data transmission, a frequency corresponding to a segment a partially overlaps a control resource set $\mathbb{R}_1$ in frequency domain, and a frequency corresponding to a segment b completely overlaps a control resource set $\mathbb{C}_1$. After receiving the downlink control signaling, the UE 1 determines a start location of each data resource in terms of time based on the start location of data transmission and indicated locations of the time-frequency resource and the control resource set $\mathbb{R}_1$ that are used for data transmission. It is assumed that time-frequency resources corresponding to areas a, b, c, and d are used for data reception.

Figure 9:
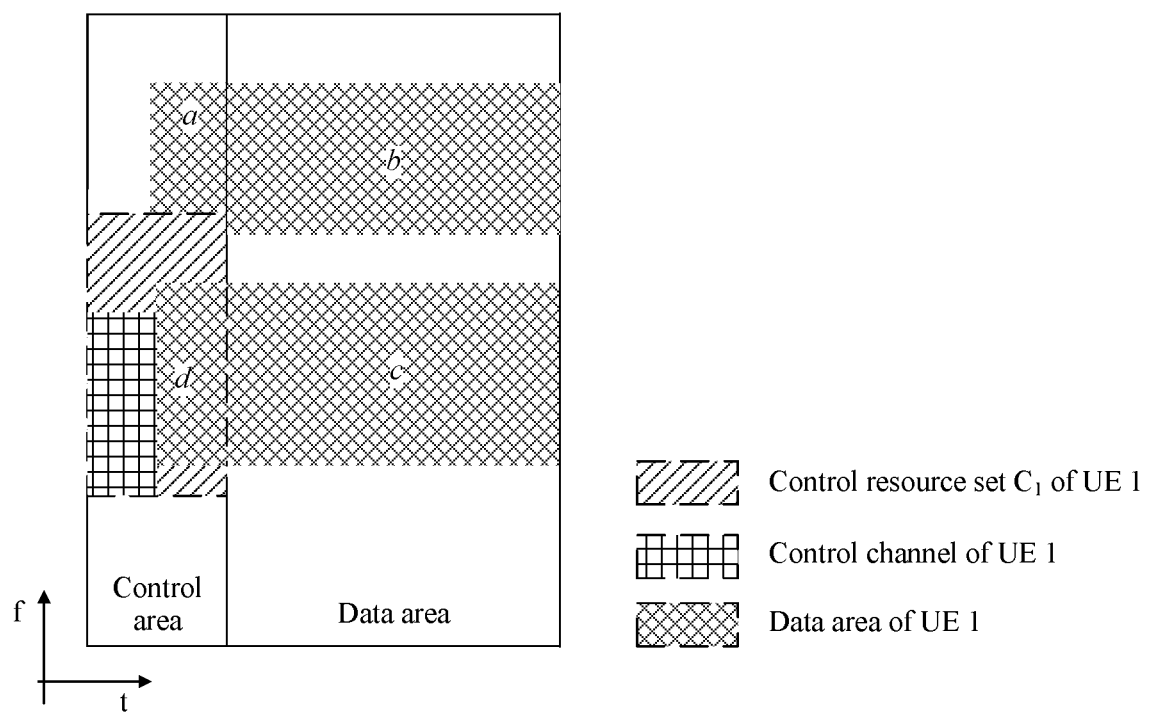
FIG. 9 is a schematic diagram 2 of resource reuse outside a control resource set in a control area according to an embodiment of the present invention.

FIG. 9 is used as an example. It is assumed that only a time-frequency resource corresponding to a control resource that is in a control area and outside a first group of one or more control resource sets $\mathbb{C}_1$ is reused, and the base station notifies, through downlink control signaling, the UE 1 that when the second instruction is "yes", the UE 1 maps data on a time-frequency resource corresponding to the start location that is of the data area and that is indicated by the third instruction and in the first group of control resource sets.

Alternatively, the first signaling includes only the third instruction, and the UE 1 receives data on a time-frequency resource that is in the control area and outside the first group of control resource sets, and receives data on a time-frequency resource starting from the start location indicated by the third instruction.

Figure 10:
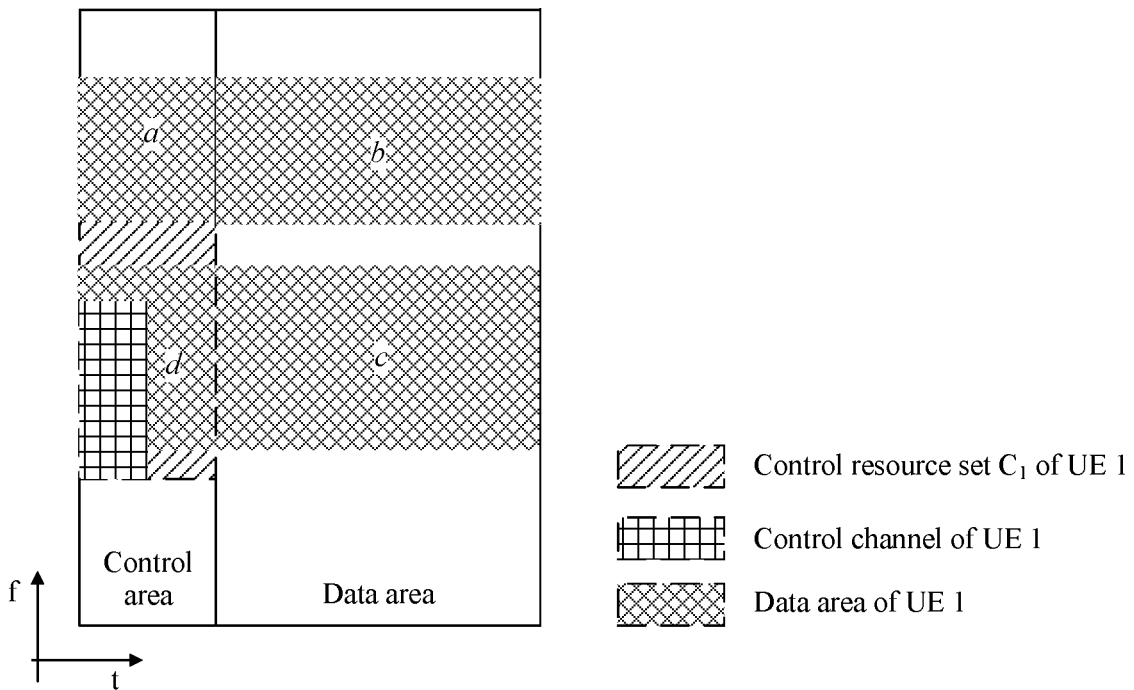
FIG. 10 is a schematic diagram 2 of resource reuse inside and outside a control resource set in a control area according to an embodiment of the present invention.

FIG. 10 is used as an example. It is assumed that the base station simultaneously reuses a time-frequency resource corresponding to control resources that are in a control area and inside and outside a first group of one or more control resource sets $\mathbb{C}_1$. The base station notifies, through downlink control signaling, the UE 1 that when the first signaling includes only the third instruction, the UE 1 receives data on the time-frequency resources that are in the control area and inside and outside the first group of control resource sets, and receives data on a time-frequency resource starting from the start location indicated by the third instruction. However, on a time-frequency resource used to send the first signaling in the time-frequency resource corresponding to the first group of control resource sets, the base station does not map the data.

In this embodiment of this application, by using the foregoing example, in data communication method provided in this embodiment of the present invention, the data is received by using the time-frequency resource corresponding to the data transmission resource frequency location indicated in the downlink control signaling and the time-frequency resource corresponding to the second group of control resource sets. Signaling overheads are reduced, and a control channel and data are dynamically reused in a control resource set.

For details of the data communication method shown in FIG. 2, refer to the following two specific embodiments provided in Embodiment 1 and Embodiment 2.

Embodiment 1

Embodiment 1 of the present invention provides a communications system, and the communications system includes a base station, UE 1, and UE 2. The system is used to reuse an idle resource in a first group of one or more control resource sets $\mathbb{C}_i$ to send data. A second group of control resource subsets $\mathbb{R}_i$ is a subset of the first group of control resource sets $\mathbb{C}_i$.

Specifically, as shown in FIG. 3, the base station separately configures a control resource set $\mathbb{C}_1$ and a control resource subset $\mathbb{R}_i$ for the UE 1 and configures a control resource set $\mathbb{C}_2$ and a control resource subset $\mathbb{R}_2$ for the UE 2. The control resource set $\mathbb{C}_1$ and the control resource set $\mathbb{C}_2$ are located in a control area at the beginning of a subframe. Time-frequency resources corresponding to control resource sets $\mathbb{C}_1$ and $\mathbb{C}_2$ are used to transmit downlink control channels of downlink control signaling of the UE 1 and the UE 2, and the downlink control signaling includes a data transmission resource indication, and a trigger indication used to indicate whether time-frequency resources in the control resource subset $\mathbb{R}_1$ and the control resource subset $\mathbb{R}_2$ are reused for data transmission. Because a control channel capacity of the UE 1 is not large relative to the control resource set $\mathbb{C}_1$, the control resource subset $\mathbb{R}_1$ is used for data transmission of the UE 1. However, because a control channel capacity of the UE 2 is relatively large relative to the control resource set $\mathbb{C}_2$, the control resource subset $\mathbb{R}_2$ is not triggered for data transmission. Then, the base station notifies, by sending downlink control signaling to the UE 1, that the control resource subset $\mathbb{R}_1$ is used for data transmission of the UE 1, and the base station notifies, by sending downlink control signaling to the UE 2, that the control resource subset $\mathbb{R}_2$ is not used for data transmission of the UE 2.

In an embodiment, one or more segments of the time-frequency resources corresponding to $\mathbb{C}_1$ and $\mathbb{C}_2$ are used to transmit downlink control channels PCFICHs of the downlink control signaling of the UE 1 and the UE 2, and the PCFICHs respectively indicate quantities of OFDM symbols occupied by $\mathbb{C}_1$ and $\mathbb{C}_2$. The downlink control signaling includes a data transmission resource indication and a trigger indication used to indicate whether the time-frequency resources corresponding to $\mathbb{R}_1$ and $\mathbb{R}_2$ are reused for data transmission.

Embodiment 2

Embodiment 2 of the present invention provides a communications system, and the communications system includes a base station, UE 1, and UE 2. The system is used to reuse idle resources that are in a control area and inside and outside a first group of one or more control resource sets $\mathbb{C}_i$ to send data. A second group of control resource subsets $\mathbb{R}_i$ is a subset of a complementary set of the first group of control resource sets $\mathbb{C}_i$.

It is assumed that the control area includes the first two OFDM symbols, and a control resource subset of the UE 1 also includes the first two OFDM symbols.

In an embodiment, there are the following manners for notifying UE whether a time-frequency resource corresponding to a second group of one or more control resource sets $\mathbb{R}_i$ is used for data transmission.

In a first manner, an indication bit is added to physical layer signaling, to indicate whether the time-frequency resource corresponding to the second group of control resource sets $\mathbb{R}_i$ is used for data transmission.

In a second manner, indication signaling of a start symbol of a data area is added to physical layer signaling, to indicate a start symbol location of the data area.

When the second group of control resource subsets $\mathbb{R}_i$ is reused for data transmission, data may be processed in two different manners.

In a first manner, only resources in the control area and outside a control resource set are reused. As shown in FIG. 6, the base station notifies, through downlink control signaling, the UE 1 that data transmission starts from the first OFDM symbol. After receiving the downlink control signaling, the UE 1 receives data on resources in areas a, b, and c.

In a second manner, resources in the control area and inside and outside a control resource set are simultaneously reused. As shown in FIG. 8, the base station notifies, through downlink control signaling, the UE 1 that data transmission starts from the second OFDM symbol. It is assumed that in frequency domain, the base station allocates two segments of resources to the UE 1 for data transmission, an upper segment of frequency resource and the control resource subset $\mathbb{R}_1$ partially overlap in frequency domain, and a lower segment of frequency resource and the control resource set completely overlap in frequency domain. Then, after receiving the downlink control signaling, the UE 1 determines a start location of each data resource in terms of time based on a start location of data transmission, a location of a resource in frequency domain, and a location of the control resource subset $\mathbb{R}_1$, in other words, it is assumed that resources in four areas a, b, c, and d are used for data reception.

Figure 11:
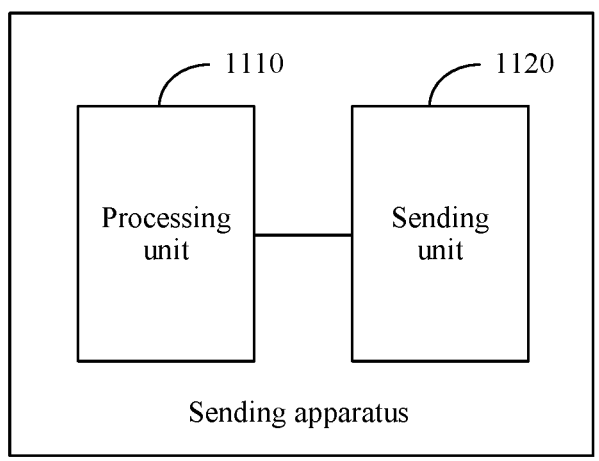
FIG. 11 is a schematic structural diagram of a sending apparatus according to an embodiment of the present invention.

FIG. 11 is a schematic structural diagram of a sending apparatus according to an embodiment of the present invention. As shown in FIG. 11, the sending apparatus includes: a processing unit 1110, configured to determine a first group of one or more control resource sets; and a sending unit 1120, configured to send the first group of control resource sets to a receiving apparatus. The sending unit 1120 is further configured to send first signaling to the receiving apparatus. The first signaling is used to instruct the receiving apparatus to receive data on a time-frequency resource for data transmission.

Optionally, the processing unit is further configured to determine a second group of one or more control resource sets. The second group of control resource sets is a subset of the first group of control resource sets, or the second group of control resource sets is a subset of a complementary set of the first group of control resource sets.

In this embodiment of this application, by using the foregoing example, this embodiment of the present invention provides the sending apparatus, and the sending apparatus dynamically triggers, based on a control channel capacity, reuse of a time-frequency resource corresponding to the second group of control resource sets, to reduce signaling overheads, and dynamically reuse a control channel and data in a control resource set.

Optionally, the sending unit 1120 is configured to separately send the first group of control resource sets and the second group of control resource sets to the receiving apparatus.

Specifically, the sending unit 1120 separately sends the first group of control resource sets and the second group of control resource sets to the receiving apparatus by using two pieces of signaling.

Optionally, the sending unit 1120 sends the first group of control resource sets and the second group of control resource sets to the receiving apparatus together.

Specifically, when a period of configuring the first group of control resource sets is the same as a period of configuring the second group of control resource sets, the sending apparatus may send the first group of control resource sets and the second group of control resource sets to the receiving apparatus by using the same piece of downlink signaling, or may separately send the first group of control resource sets and the second group of control resource sets by using two pieces of downlink signaling.

Optionally, the sending unit 1120 sends the first group of control resource sets and the second group of control resource sets to the receiving apparatus in a semi-static manner. Semi-static sending reduces signaling power consumption compared with real-time dynamic sending.

Optionally, the first signaling includes a first instruction and a second instruction, the first instruction is used to indicate the time-frequency resource for data transmission, and the second instruction is used to indicate whether a time-frequency resource corresponding to the second group of control resource sets is reused for data transmission.

Specifically, the sending unit 1120 may be configured to: determine, based on a control channel capacity or a control channel status, whether the second group of control resource sets is used for data transmission, and notify, in one of the following manners, the receiving apparatus whether the time-frequency resource corresponding to the second group of control resource sets is used for data transmission.

In a first manner, when the second group of control resource sets is not used for data transmission, the first signaling is mapped on a time-frequency resource corresponding to the first group of control resource sets and the time-frequency resource corresponding to the second group of control resource sets, and the second instruction is set to "no".

In a second manner, when the second group of control resource sets is used for data transmission, the first signaling is mapped on a time-frequency resource corresponding to the first group of control resource sets, the second instruction is set to "yes", and data is mapped on the time-frequency resource corresponding to the second group of control resource sets.

In a third manner, the first signaling includes a third instruction; and when the time-frequency resource corresponding to the second group of control resource sets is used for data transmission, the third instruction is added to the first signaling, and the third instruction is used to indicate a start location of a data area.

Specifically, a part of the time-frequency resource corresponding to the second group of control resource sets may be used for data transmission, and the sending apparatus adds indication signaling for the start location of the data area to downlink control signaling, where the indication signaling is used to indicate the start location of the data area.

Figure 12:
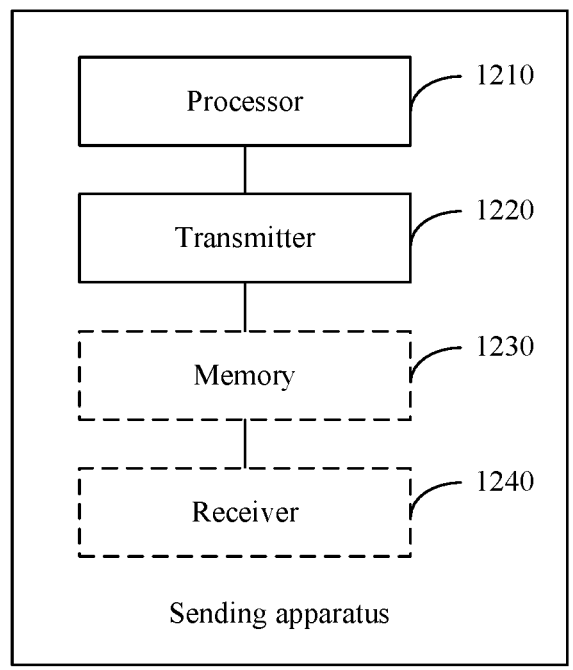
FIG. 12 is a schematic structural diagram of another sending apparatus according to an embodiment of the present invention.

In addition, the sending apparatus provided in this embodiment of the present invention may be alternatively implemented in the following manner to implement the communication method in the foregoing embodiment of the present invention. As shown in FIG. 12, the sending apparatus includes a processor 1210 and a transmitter 1220.

In an optional embodiment, the sending unit 1120 in the embodiment in FIG. 11 may be replaced with the transmitter 1220. Specifically, the processor 1210 is configured to determine a first group of one or more control resource sets. The processor 1210 may determine, based on a control channel capacity or a control channel status, whether a second group of one or more control resource sets is used for data transmission.

There are several manners of determining whether the second group of control resource sets is used for data transmission.

In a first manner, when the second group of control resource sets is not used for data transmission, a processor 1210 is configured to: map first signaling on a time-frequency resource corresponding to the first group of control resource sets and a time-frequency resource corresponding to the second group of control resource sets, and set a second instruction as that the time-frequency resource corresponding to the second group of control resource sets is not used for data transmission.

In a second manner, when the second group of control resource sets is used for data transmission, a processing unit is configured to: map first signaling on a time-frequency resource corresponding to the first group of control resource sets, set a second instruction as that a time-frequency resource corresponding to the second group of control resource sets is used for data transmission, and map data on the time-frequency resource corresponding to the second group of control resource sets.

The processor 1210 is further configured to: when the time-frequency resource corresponding to the second group of control resource sets is used for data transmission, add a third instruction to the first signaling, where the third instruction is used to indicate a start location of a data area.

The transmitter 1220 sends the first group of control resource sets and the second group of control resource sets to a receiving apparatus, where the second group of control resource sets is a subset of the first group of control resource sets, or the second group of control resource sets is a subset of a complementary set of the first group of control resource sets. The transmitter 1220 is further configured to send downlink control signaling to the receiving apparatus, where the downlink control signalling is used to instruct the receiving apparatus to receive data on a time-frequency resource corresponding to a data transmission resource frequency location and the resource corresponding to the second group of control resource sets.

Optionally, the sending apparatus may further include a memory 1230 and a receiver 1240.

For a processing procedure of each unit in FIG. 12, refer to the specific embodiment shown in FIG. 2. Details are not described herein again.

Figure 13:
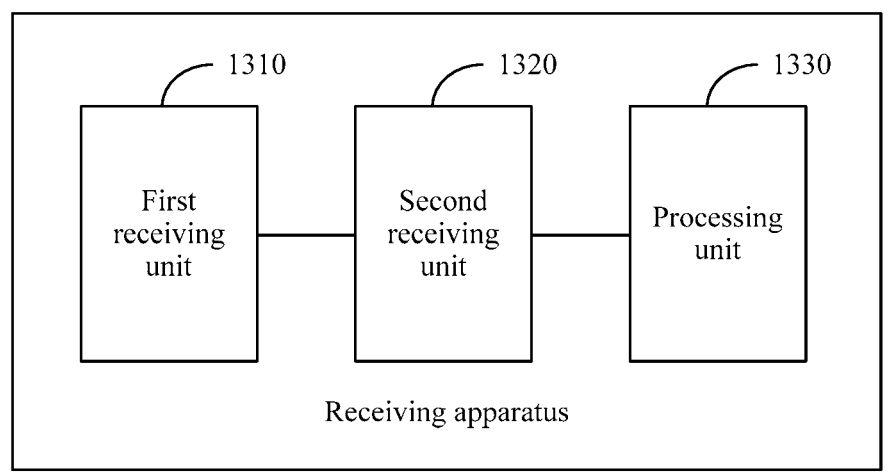
FIG. 13 is a schematic structural diagram of a receiving apparatus according to an embodiment of the present invention.

FIG. 13 is a schematic structural diagram of a receiving apparatus according to an embodiment of the present invention. As shown in FIG. 13, the receiving apparatus includes:

a first receiving unit 1310, configured to receive a first group of one or more control resource sets and a second group of one or more control resource sets that are sent by a sending apparatus, where the second group of control resource sets is used to indicate whether the sending apparatus sends data on the second group of control resource sets; and a second receiving unit 1320, configured to: receive first signaling sent by the sending apparatus, and receive, based on the first signaling, data on a time-frequency resource for data transmission and a time-frequency resource corresponding to the second group of control resource sets.

In this embodiment of this application, by using the foregoing example, this embodiment of the present invention provides the receiving apparatus, and the receiving apparatus receives, based on the received downlink control signaling, the data on a time-frequency resource corresponding to a data transmission resource frequency location indicated in the downlink control signaling and the time-frequency resource corresponding to the second group of control resource sets. Signaling overheads are reduced, and a control channel and data are dynamically reused in a control resource set.

Optionally, a second obtaining unit 1120 is further configured to obtain first service data and a first identifier that are sent by an upper layer.

Optionally, the second receiving unit 1320 is configured to compare a result of time-frequency resource modulation and coding corresponding to the first group of control resource sets with a verification code. When the result is the same as the verification code, the result is correct first signaling. When the result is different from the verification code, blind detection continues to be performed.

Optionally, the first signaling includes a first instruction and a second instruction, the first instruction is used to indicate the time-frequency resource for data transmission, and the second instruction is used to indicate whether the time-frequency resource corresponding to the second group of control resource sets is reused for data transmission.

Specifically, the second receiving unit 1320 is configured to: when the second instruction is that the second group of control resource sets is used for data transmission, receive the data on the time-frequency resource for data transmission and the time-frequency resource corresponding to the second group of control resource sets; or when the second instruction is that the second group of control resource sets is not used for data transmission, receive the data on the time-frequency resource for data transmission.

Optionally, the first signaling includes a third instruction, and the third instruction is used to indicate a start location of a data area.

It should be noted that the first receiving unit 1310 and the second receiving unit 1320 in this embodiment of the present invention may be a same receiving unit, and "first" and "second" are used to distinguish between technical terms during description.

Figure 14:
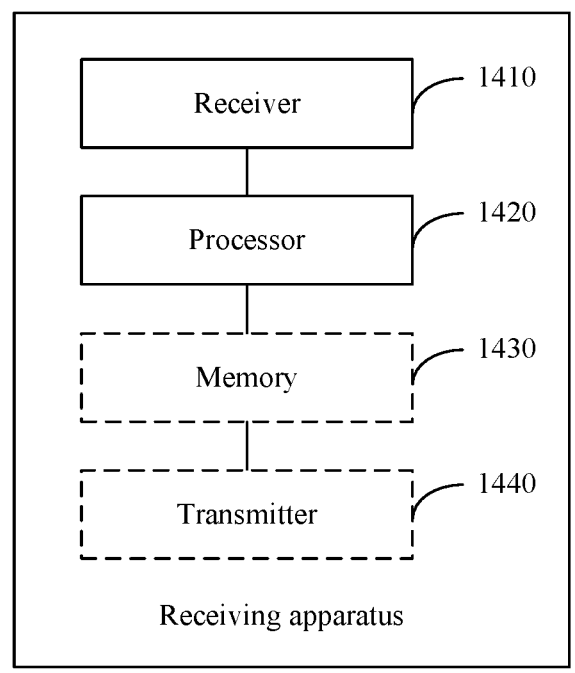
FIG. 14 is a schematic structural diagram of another receiving apparatus according to an embodiment of the present invention.

In addition, the receiving apparatus provided in this embodiment of the present invention may be alternatively implemented in the following manner to implement the communication method in the foregoing embodiment of the present invention. As shown in FIG. 14, the receiving apparatus includes a receiver 1410.

In an optional embodiment, the first receiving unit 1310 and the second receiving unit 1320 in the embodiment in FIG. 13 may be replaced with the receiver 1410. Specifically, the receiver 1410 receives a first group of one or more control resource sets and a second group of one or more control resource sets that are sent by a sending apparatus, where the first group of control resource sets indicates a control resource set location, the second group of control resource sets is used to indicate whether the sending apparatus sends data on the second group of control resource sets, the second group of control resource sets is a subset of the first group of control resource sets, or the second group of control resource sets is a subset of a complementary set of the first group of control resource sets. The receiver 1410 is further configured to: receive downlink control signaling sent by the sending apparatus, and receive, based on the downlink control signaling, data on a time-frequency resource for data transmission and a time-frequency resource corresponding to the second group of control resource sets.

Optionally, the receiving apparatus may further include a processor 1420, a memory 1430, and a transmitter 1440.

For a processing procedure of each unit in FIG. 14, refer to the specific embodiment shown in FIG. 2. Details are not described herein again.

Based on the data communication method, the apparatus, and the system provided in the embodiments of the present invention, when receiving the first signaling sent by the sending apparatus, the receiving apparatus receives the data on the time-frequency resource corresponding to the data transmission resource frequency location indicated by the first signaling and the time-frequency resource corresponding to the second group of control resource sets. Signaling overheads are reduced, and a control channel and data are dynamically reused in a control resource set.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A data communication method, comprising:
    sending first higher-layer signaling to a terminal device, wherein the first higher-layer signaling indicates a first group of resources;
    sending second higher-layer signaling to the terminal device, wherein the second higher-layer signaling indicates a second group of resources, and wherein the second group of resources is a subset of the first group of resources; and
    sending downlink control signaling to the terminal device on the first group of resources, wherein the downlink control signaling comprises a first instruction and a second instruction, wherein the first instruction indicates a time-frequency resource for data transmission, and wherein the second instruction indicates that the second group of resources is not used for data transmission.

2. The method according to claim 1, wherein sending the first higher-layer signaling to the terminal device comprises:
    sending the first higher-layer signaling to the terminal device in a semi-static manner;
    wherein sending the second higher-layer signaling to the terminal device comprises:
        sending the second higher-layer signaling to the terminal device in a semi-static manner; and
    wherein sending the downlink control signaling to the terminal device comprises:
        sending the downlink control signaling to the terminal device in a dynamic manner.

3. A data communication method, comprising:
    receiving first higher-layer signaling from a network device, wherein the first higher-layer signaling indicates a first group of resources;
    receiving second higher-layer signaling from the network device, wherein the second higher-layer signaling indicates a second group of resources, and wherein the second group of resources is a subset of the first group of resources; and
    receiving downlink control signaling from the network device on the first group of resources, wherein the downlink control signaling comprises a first instruction and a second instruction, wherein the first instruction indicates a time-frequency resource for data transmission, and wherein the second instruction indicates that the second group of resources is not used for data transmission.

4. A data communication apparatus, comprising:
    a storage medium including executable instructions; and
    at least one processor, wherein the executable instructions, when executed by the at least one processor, cause the apparatus to:
        send first higher-layer signaling to a terminal device, wherein the first higher-layer signaling indicates a first group of resources;
        send second higher-layer signaling to the terminal device, wherein the second higher-layer signaling indicates a second group of resources, and wherein the second group of resources is a subset of the first group of resources; and send downlink control signaling to the terminal device on the first group of resources, wherein the downlink control signaling comprises a first instruction and a second instruction, wherein the first instruction indicates a time-frequency resource for data transmission, and wherein the second instruction indicates that the second group of resources is not used for data transmission.

5. The apparatus according to claim 4, wherein the executable instructions, when executed by the at least one processor, cause the apparatus to:
send the first higher-layer signaling to the terminal device in a semi-static manner;
send the second higher-layer signaling to the terminal device in a semi-static manner; and
send the downlink control signaling to the terminal device in a dynamic manner.

6. A data transmission apparatus, comprising:
a storage medium including executable instructions; and
at least one processor, wherein the executable instructions, when executed by the at least one processor, cause the apparatus to:
receive first higher-layer signaling from a network device, wherein the first higher-layer signaling indicates a first group of resources;
receive second higher-layer signaling from the network device, wherein the second higher-layer signaling indicates a second group of resources, and wherein the second group of resources is a subset of the first group of resources; and
receive downlink control signaling from the network device on the first group of resources, wherein the downlink control signaling comprises a first instruction and a second instruction, wherein the first instruction indicates a time-frequency resource for data transmission, and wherein the second instruction indicates that the second group of resources is not used for data transmission.

7. The method according to claim 3, wherein receiving the first higher-layer signaling from the network device comprises:
receiving the first higher-layer signaling from the network device in a semi-static manner;
wherein receiving the second higher-layer signaling from the network device comprises:
receiving the second higher-layer signaling from the network device in a semi-static manner; and
wherein receiving the downlink control signaling from the network device comprises:
receiving the downlink control signaling from the network device in a dynamic manner.

8. The apparatus according to claim 6, wherein the executable instructions, when executed by the at least one processor, cause the apparatus to:
receive the first higher-layer signaling from the network device in a semi-static manner;
receive the second higher-layer signaling from the network device in a semi-static manner; and
receive the downlink control signaling from the network device in a dynamic manner.

* * * * *